Case A

THOMAS E. McDONALD.

Improvement in Spindles for Wringer Rolls.

No. 120,207.                                   Patented Oct. 24, 1871.

Witnesses:
T. C. Brecht.
Geo. C. Poulton

Inventor:
Thomas E. McDonald
By N. Cranford, atty.

120,207

UNITED STATES PATENT OFFICE.

THOMAS E. McDONALD, OF TRENTON, NEW JERSEY.

IMPROVEMENT IN SPINDLES FOR WRINGER-ROLLS.

Specification forming part of Letters Patent No. 120,207, dated October 24, 1871.

*To all whom it may concern:*

Be it known that I, THOMAS E. MCDONALD, of Trenton, in the county of Mercer in the State of New Jersey, have made certain Improvements in Spindles for Clothes-Wringer Rolls, of which the following is a specification:

The object of this invention is to produce a cheap and desirable clothes-wringer-roll spindle, and such a spindle that the rubber making the roll when formed around it cannot be detached from the spindle; and it consists in the construction of the spindle as is more fully hereinafter described.

Figure 1:
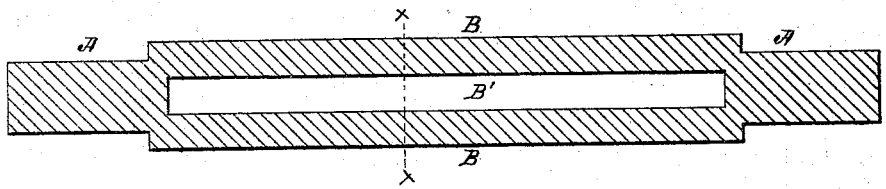
Figure 2:
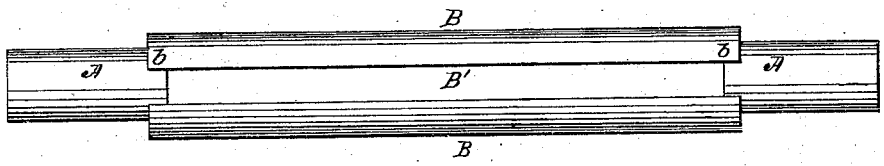
Figure 3:
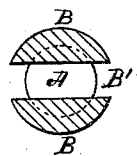

In the drawing, Figure 1 is a longitudinal sectional view of the spindle. Fig. 2 is a side view, and Fig. 3 is a transverse sectional view at $x\ x$ of Fig. 1.

A A represents the journal of the spindle made from round metal of the proper size and length. B B are half-round or oval metal bars of the proper width and of such length as to lap upon and be welded or brazed to opposite sides of each of the journals A—not wide enough to surround the journals, but to leave a space, B', between them. This space B' forms a slot nearly the whole length of the spindle, leaving only space enough between it and the shoulders or ends of the bars B for the weld of the bars B to journals A, as seen in Figs. 1 and 2.

When a spindle is thus formed with the longitudinal slot B' having the bars B welded or brazed at their ends $b$ to the journals A, the journals are then centered and turned off to the proper size and length, when it is ready to have the rubber which forms the roll by surrounding it; and being firmly attached thereto, which is done by placing the spindle into bearings in a proper mold or matrix and casting the heated or fluid rubber about the spindle, the rubber filling the slot B' will be united and intimately connected with the body of the roll that embraces the body of the spindle, and no force short of tearing the rubber asunder can displace the rubber or separate it from the spindle.

Any other known method of applying the rubber to the spindle may be used, as my invention is confined to the construction of the spindle and not to the method of attaching the rubber to it.

The spindle may be of cast malleable metal when desired.

I am aware of the patent granted to R. B. Hugunin, August 2, 1864, for wringer-rolls in which there was a longitudinal slot to receive a sheet of rubber of the thickness of the width of the slot and having a number of rivet-holes through the side bars of the spindle, in which and through the sheet-rubber were rivets to hold the sheet of rubber in place, while its ends were bent in opposite directions around the spindle to form the roll, and there be held and vulcanized; and I lay no claim to such slot when used as described and shown in said patent, as the slot through the spindle that receives the sheet-rubber is not of itself sufficient to hold the rubber without the aid of the rivets that pass transversely through the sheet-rubber and slot and held by the bars on the sides of the slot; while the slot in my spindle is for an entirely different construction of roll, formed in a different manner, and holding the rubber therein without the use of rivets.

Having thus described by invention, what I claim, and desire to secure by Letters Patent, is—

The clothes-wringer-roll spindle herein described, consisting of the journals A and metal B, united together in the manner and for the bars purpose set forth.

THOMAS E. McDONALD.

Witnesses:
RANDOLPH H. MOORE,
EDWIN A. MOORE.

(91)